J. A. VIELE.
INTERNAL COMBUSTION ENGINE.
APPLICATION FILED NOV. 29, 1909.

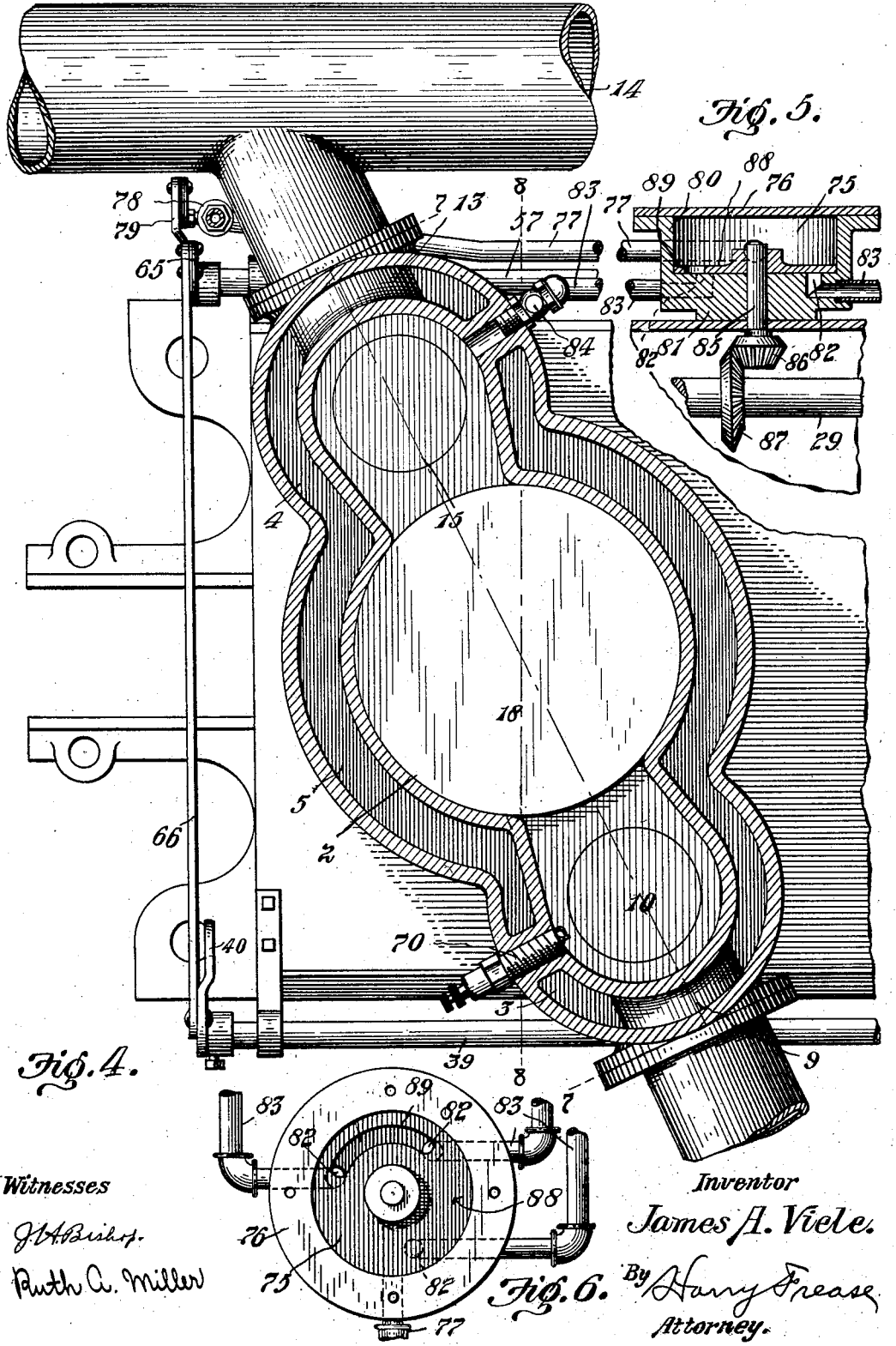

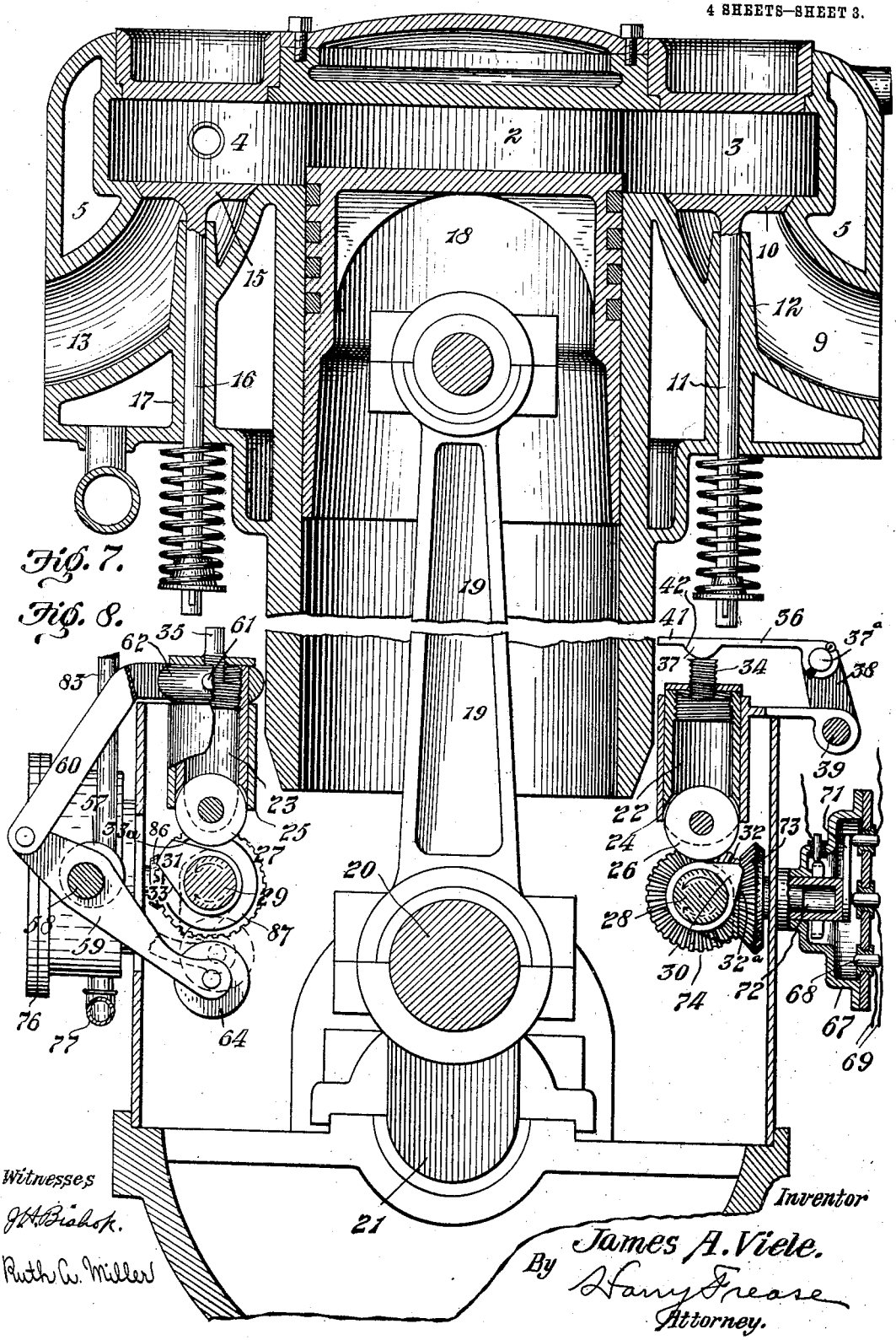

979,359.

Patented Dec. 20, 1910.

4 SHEETS—SHEET 4.

Witnesses
J. H. Bishop
Ruth A. Miller

Inventor
James A. Viele.
By Harry Frease
Attorney.

UNITED STATES PATENT OFFICE.

JAMES A. VIELE, OF WARREN, PENNSYLVANIA.

INTERNAL-COMBUSTION ENGINE.

979,359.        Specification of Letters Patent.    Patented Dec. 20, 1910.

Application filed November 29, 1909. Serial No. 530,300.

*To all whom it may concern:*

Be it known that I, JAMES A. VIELE, a citizen of the United States, residing at Warren, in the county of Warren and State of Pennsylvania, have invented certain new and useful Improvements in Internal-Combustion Engines, of which the following is a specification.

The invention relates to gas or gasolene engines, and the objects of the improvements are to provide simple, durable and positive means for reversing and starting the engine in either direction. The gas intake and exhaust valves in engines of this type are frequently operated by means of cam shafts located on opposite sides and parallel with the main crank shaft, with which the cam shafts are geared; and in the present invention the reversing of the engine is accomplished by a direct rotation, without endwise shifting, of the cam shafts, with reference to the correlated mechanism. The usual timing device for the electric igniters is suitably coördinated by a gearing connection, preferably with the intake cam-shaft; and a novel distributing valve is provided for admitting compressed air into certain combustion chambers for starting the engine, which valve is likewise coördinated by a connecting gearing, preferably with the exhaust camshaft. All these parts are so arranged that the direct rotation of the cam-shafts for reversing the engine also turns the timing device and the distributing valve to coördinate the same for the reverse operation of the engine. And finally, means are provided for changing the action of the exhaust valves of one of each pair of cylinders to permit a two cycle operation of the engine for starting the same by compressed air.

The various features of the invention, thus briefly set forth in general terms, and other ancillary advantages, are illustrated in the accompanying drawings, showing a preferred embodiment of the improvements in a six-cylinder engine, in which drawings—

Figure 3:
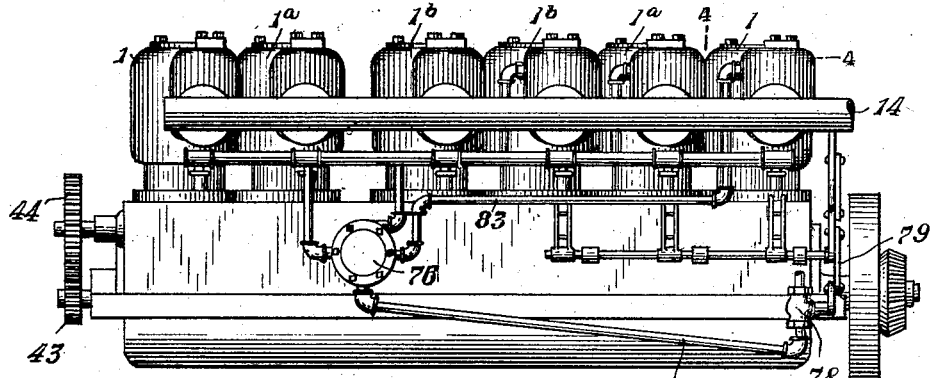
Figure 1:
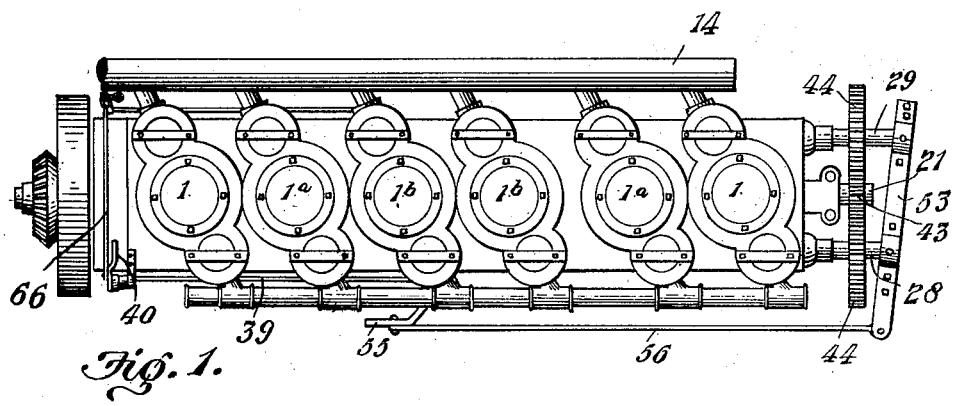
Figure 2:
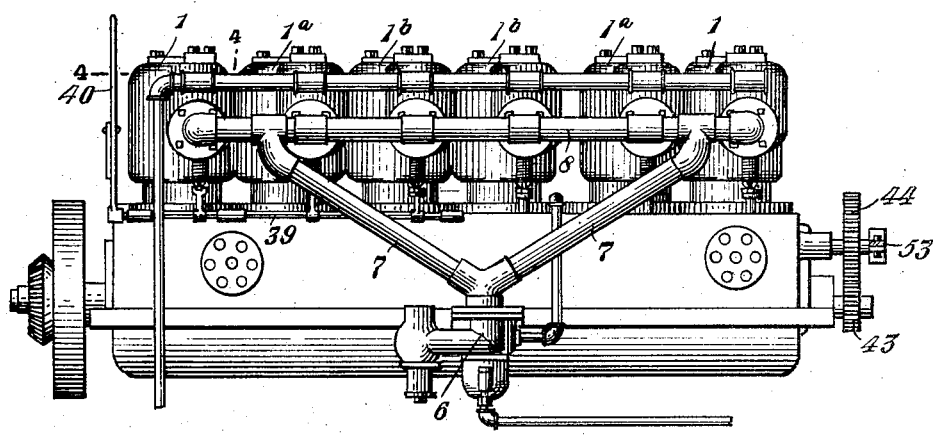
Figure 9:
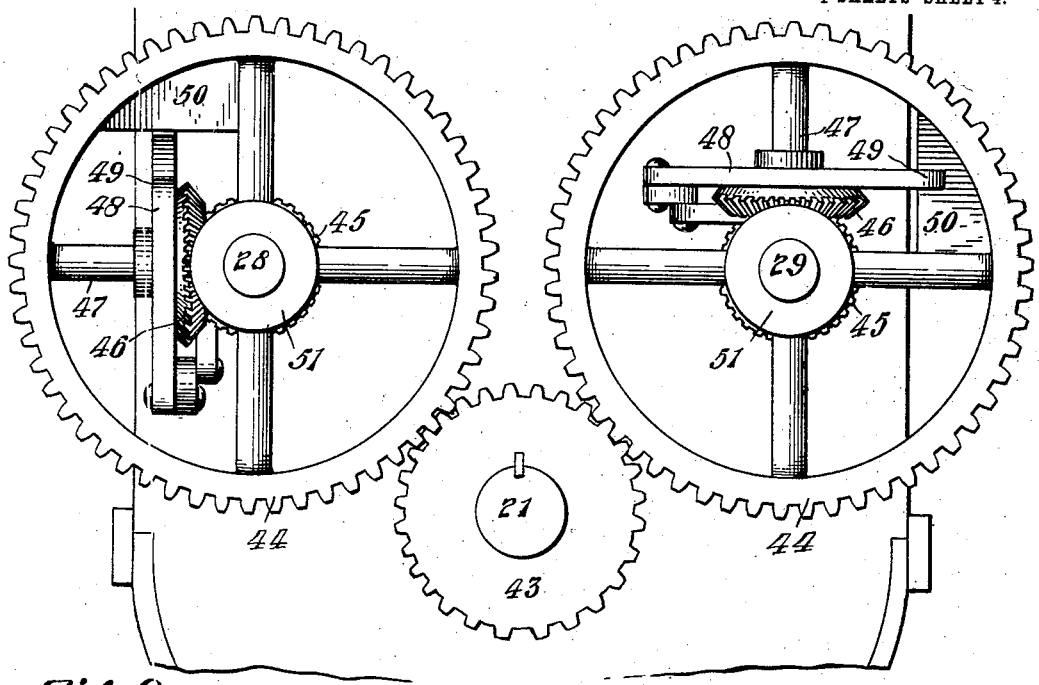
Figure 10:
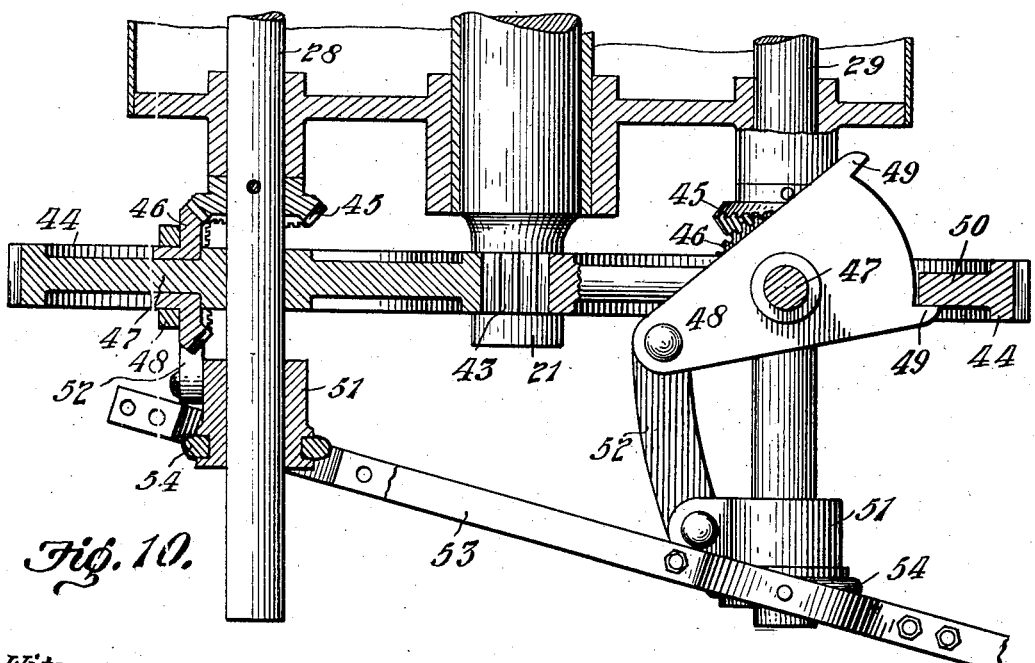

Figure 1 is a plan view, Fig. 2 a right side elevation, and Fig. 3 a left side elevation, of the engine; Fig. 4, an enlarged plan section of the rearmost cylinder on line 4—4, Figs. 2 and 3; Fig. 5, a fragmentary plan section of the compressed-air distributing valve; Fig. 6, a detached view of the compressed-air distributing valve with the face plate removed; Fig. 7, a transverse section of the upper portion of one cylinder, as on line 7—7, Fig. 4; Fig. 8, a transverse view of the lower portion of one of the cylinders, as on line 8—8, Fig. 4, also showing the timing device in section and distributing valve in elevation; Fig. 9, a plan, partly in section, of the reversing gearing; and Fig. 10, a front elevation of the same, without the sleeve-lever.

Similar or successive numerals refer to similar parts throughout the drawings.

The engine includes three pairs of cylinders 1, 1ª and 1ᵇ, the respective cylinders of each pair being arranged to operate on alternate strokes, and the cylinders of the several pairs being arranged to operate successively in the usual manner. In the upper end of each cylinder is provided a combustion chamber 2 which is extended laterally to form a communicating chamber 3 on one side and an exhaust chamber 4 on the other side, around which parts the usual cooling water chamber 5 is provided. The vaporized fuel is drawn from the carbureter 6 through the pipes 7, drum 8 and intake port 9, the entrance of which port into the intake chamber 3 being normally closed by the intake valve 10 which is provided with the spring-controlled vertical stem 11 adapted to operate endwise in the guide 12. The exhaust port 13 leads from the exhaust chamber 4 to the exhaust drum 14 and the opening is normally closed by the exhaust valve 15 which is provided with the spring-controlled vertical stem 16 adapted to operate endwise in the guide 17. The piston 18 and connecting rod 19 of each cylinder are connected with a crank pin 20 on the main shaft 21 of the engine; the crank pins of the two cylinders of each pair being likewise located with reference to the main shaft, and the pins of the other pairs being equally spaced therefrom and from each other in the usual manner for the successive operation of the cylinders.

The lifters 22 and 23 are provided beneath the lower ends of the stems 11 and 16 of the intake and exhaust valves, which lifters are adapted to slide vertically in the guides 24 and 25, and are provided with the rollers 26 and 27 on the lower ends. The longitudinal counter shafts 28 and 29 are journaled below the valve lifters and are provided with the cams 30 and 31 having the similar faces 32, 32ª and 33, 33ª on opposite ends, adapted to operate on the rollers to raise the respective valve lifters when the shafts are rotated in opposite directions. The free upper ends of the stems 34 and 35 of the respective lifters are alined with and adapted to abut the free lower ends of the intake and exhaust valve stems 11 and 16 to raise the same in the usual manner; except in the case of one cylinder of each pair, being the three rear cylinders as shown, wherein the pallet 36 intervenes between the stems of the lifter and the intake valve.

The pallet 36 is formed with the boss 37 which normally rests on the upper end of the lifter pin 34, in which relation of the parts the upper face of the pallet is adapted to abut the free lower end of the stem 11 of the intake valve to raise the same in lieu of the lifter stem. The outer end of each pallet is pivoted at 37ª to a lever 38 which is secured on the shaft 39 which is adapted to be rotated by the starting lever 40 to move the pallet outward so that the boss 37 will slide off the lifter stem 34 and permit the thinner free end 41 of the pallet to drop down upon the same, the inner side 42 of the boss being beveled or inclined so that a reverse movement of the lever 38 will cause the boss of the pallet to again slide upward upon the lifter stem into its normal position. These parts are so arranged that when the pallet is moved outward to drop its free end downward upon the lifter stem, the valve lifter is rendered inoperative to raise the intake valve, thus adapting the three rear cylinders to be started by compressed air as described below.

The reversing gearing includes the main pinion 43 secured on the forward end of the main shaft 21, and a gear wheel 44 journaled on the forward ends of each of the cam shafts 28 and 29 and respectively geared with the main pinion 43 so that each cam shaft rotates once for two revolutions of the main shaft, whereby the intake and exhaust valves are opened and closed for a four-cycle operation of the respective cylinders of the engine. A beveled gear 45 is secured on each cam shaft adjacent to and preferably inside the gear wheel 44, and a similar gear 46 is rotatably mounted on the radial journal 47, preferably formed on the spoke of the gear wheel, which journaled gear is arranged to mesh with the gear secured to the cam shaft. A plate 48 is secured on the hub of each journaled gear 46, on one end of which plate are provided the opposed stops 49 which are adapted to abut alternate sides of the web flange 50 formed or secured in each gear wheel, whereby the rotation of the journaled gear is limited and stopped in each direction. A sliding sleeve 51 is provided on each cam shaft, preferably outside the gear wheel, and the ends of the connecting bar 52 are pivoted to the sleeve and the free end of the stop-plate. The sleeves are operated in opposite directions along the shaft by means of the transverse lever 53 which is pivoted to the trunnioned rings 54, which rings are swiveled on the sliding sleeves in the usual manner, and the transverse lever is adapted to be operated by a conveniently located reversing lever 55 and an intervening connecting rod 56. The normal relation of these parts when the cams on the shafts are in position to operate the valves for driving the engine in one direction, as shown by full lines in Fig. 8, is with one of the stop lugs 49 in contact with one side of the web plate 50, and, when it is desired to reverse the engine, the reversing lever is thrown to shift the sliding sleeves and rotate the reversing pinions to bring the other stop lug against the other side of the web flange. As the gear wheels 44 are stopped against rotation by engagement with the main pinion 43, the rotation of the journaled gear 46 serves to rotate the intermeshing gears 45, and with them the cam shafts 28 and 29 in opposite directions to such an extent that the position of the cams thereon is changed with relation to the main shaft and the valve lifters, as shown by broken lines in Fig. 8, to reverse the operation of the engine.

The crank shaft 57 is located parallel with and adjacent to the outer side of the exhaust cam shaft 29 on the crank pins 58 of which shaft are pivoted the lift-levers 59, one of which levers is provided for each of the three rear cylinders, to the upper ends of which levers are pivoted the starting lift yokes 60 in the upper ends of which are pivoted the trunnions 61 on the sides of the lift rings 62 which freely surround the upper end of the exhaust valve lifter 23 under the shoulder formed by the peripheral edge portions of the lock nut on the upper end thereof, preferably by screwing on the stem 35 thereof. The free end of the lever 59 is provided with the roller 64 located directly underneath the reverse cam shaft 29 and normally below the path of the corresponding cam 33 thereon, as shown by full lines in Fig. 8. The parts are so arranged, however, that by a rotation of the crank shaft 57, the free end of the lever 59 is thrown upward by the crank pins 58 to bring the face 64 in the path of the cam 33, as shown by broken lines in Fig. 8, and the depression of this end of the lever by the cam 33 throws the other end upward and causes the yoke 60 to raise the lifter 23 and thereby to raise and open the exhaust valve intermediate the time it is opened by the ordinary lifter 23, whereby the exhaust valve is opened twice for each revolution of the cam shaft 29, or once for each revolution of the main shaft, which adapts the three cylinders affected for a two-cycle operation for starting with compressed air. In the normal inoperative position of these parts, the lifting ring 62 rests on the upper end of the guide 25 and the lifter 23 operates freely through it. The crank lever 65 is secured on the lifting shaft 57 and its movements are coördinated with the movements of the pallet starting lever 40 by the connecting rod 66, so that when the inlet valve lifters 22 are rendered inoperative, the exhaust valve lifting levers 59 are thrown into operative position.

One or more ordinary electric timers 67 are provided on the side of the engine, the contact pieces 68 of which are connected by suitable wires 69 with ordinary sparking plugs 70 extending into the combustion chamber. The switch arm 71 of the timer is secured on the outer end of the shaft 72 and the beveled pinion 73 is secured on the inner end thereof, which pinion meshes with the beveled gear wheel 74 on the adjacent cam shaft as 28, and the parts are so arranged and geared that the igniting plugs are caused to spark at the proper time with reference to the operation of the engine valves when the cam shaft is being rotated in either direction.

Compressed air for starting the engine is received into the cavity 75 of the distributing valve 76 from any suitable source through the supply pipe 77, the same being controlled by the supply valve 78 which may be operatively coördinated with the crank-lever 65 by means of the connecting bar 79 so that the valve is opened when the crank-lever 65 is thrown into operative position. The distributing valve 76 is composed of the short cylindric case 80 secured on the side of the engine through the comparatively thick inner head 81 of which are provided three several ports 82, the inner ends of which open into the end of the cylindric cavity 75 of the distributer and in the outer ends of these ports are connected the distributing pipes 83 which lead and open through the check valves 84 into the combustion chamber, preferably in the exhaust extensions thereof as shown, of each of the three rear cylinders. The axial shaft 85 is provided through the inner head of the valve, on the inner end of which shaft is secured the beveled pinion 86 which meshes with the beveled gear wheel 87 secured on one of the cam shafts as 29; and on the outer end of the valve shaft is secured the valve disk 88 which normally closes the openings of the ports 81 and is provided with the annular slot 89 which is adapted to register with the openings of the ports at a time, to permit the compressed air to flow from the cavity 82 of the valve to the proper combustion chambers. These parts are so arranged and geared that compressed air will flow into each of the three combustion chambers at the proper time to operate the pistons in the corresponding cylinders every downward stroke in either direction the engine may be run.

To start the engine, the starting lever 40 is thrown from its normal or running position, to its operative position, which serves to slide the pallet 36 outward to render the intake valve lifters of the three rear cylinders inoperative, to rotate the crank shaft 57 to throw the roller 64 in the path of the exhaust cams, and to open the compressed air supply valve 78; which admits the air into the combustion chambers for a two-cycle operation of the three rear cylinders. When the three forward cylinders have been charged by suction from the carbureter and begin operation, in the usual manner, the starting lever is then thrown back to normal or running position which closes the compressed air supply valve, renders the supplemental lifting levers inoperative, and slides the pallet inward to render the intake valve lifters operative in all the cylinders.

I claim:

1. An internal combustion engine including at least six cylinders, intake valves and exhaust valves for the several cylinders, a main shaft common to all the cylinders, counter-shafts geared to the main shaft and having actuating cams thereon adapted to open the valves for a four-cycle operation of the engine, means for supplying compressed air to at least three of the cylinders for a two-cycle operation thereof, means independent of the cam shafts for rendering inoperative the intake-valve actuating-cams of the three cylinders, and means for opening the exhaust-valves of the three cylinders for the two-cycle operation, all for operating the engine in either direction.

2. An internal combustion engine including at least six cylinders, intake valves and exhaust valves for the several cylinders, a main shaft common to all the cylinders, counter-shafts geared to the main shaft and having actuating cams thereon adapted to open the valves for a four-cycle operation of the engine, means for supplying compressed air to at least three of the cylinders for a two-cycle operation thereof, means independent of the cam shafts for rendering inoperative the intake-valve actuating cams of the three cylinders, and means for opening the exhaust valves of the three cylinders for the two-cycle operation.

3. An internal combustion engine including at least three cylinders, intake valves and exhaust valves for the several cylinders, a main shaft common to all the cylinders, counter-shafts geared to the main shaft and having actuating cams thereon adapted to open the valves for a four-cycle operation, means for supplying compressed air to the cylinders for a two-cycle operation, means independent of the cam shafts for rendering inoperative the intake-valve actuating cams, and means for opening the exhaust-valves of the cylinders for the two-cycle operation, all for operating the engine in either direction.

4. An internal combustion engine including at least three cylinders, intake valves and exhaust valves for the several cylinders, a main shaft common to all the cylinders, counter-shafts geared to the main shaft and having actuating cams thereon adapted to open the valves for a four-cycle operation, means for supplying compressed air to the cylinders for a two-cycle operation, means independent of the cam shafts for rendering inoperative the intake-valve actuating cams, and means for opening the exhaust-valves of the cylinders for the two-cycle operation.

5. An internal combustion engine including at least six cylinders, intake valves and exhaust valves for the several cylinders, mechanism to directly open the intake and exhaust valves for a four-cycle operation of the engine, means independent of the cam shafts for rendering inoperative the intake-valve opening mechanism of at least three cylinders, means for opening the exhaust valves for a two-cycle operation of the three cylinders, and valve-controlled compressed air inlets for a two-cycle operation of the three cylinders, all adapted to operate the engine in either direction.

6. An internal combustion engine including at least six cylinders, intake valves and exhaust valves for the several cylinders, mechanism to directly open the intake and exhaust valves for a four-cycle operation of the engine, means independent of the cam shafts for rendering inoperative the intake-valve opening mechanism of at least three cylinders, means to open the exhaust valves for a two-cycle operation of the three cylinders, and valve-controlled compressed air inlets for a two-cycle operation of the three cylinders.

7. An internal combustion engine including at least three cylinders, intake valves and exhaust valves for the several cylinders, mechanism to directly open the intake and exhaust valves for a four-cycle operation of the engine, means independent of the cam shafts for rendering inoperative the intake-valve opening mechanism, means to open the exhaust valves for a two-cycle operation, and valve-controlled compressed air inlets for a two-cycle operation, all adapted to operate the engine in either direction.

8. An internal combustion engine including at least three cylinders, intake valves and exhaust valves for the several cylinders, mechanism to directly open the intake and exhaust valves for a four-cycle operation of the engine, means independent of the cam shafts for rendering inoperative the intake-valve opening mechanism, means to open the exhaust valves for a two-cycle operation, and valve-controlled compressed air inlets for a two-cycle operation.

9. A valve-operating mechanism for the intake-valves and exhaust-valves of a multiple-cylinder internal-combustion engine including a main shaft common to all the cylinders, counter-shafts pertaining to each series of valves and geared to the main shaft, cams on the counter-shafts having similar faces on opposite ends adapted to actuate the valves to operate the engine in reverse directions, and means for directly rotating the counter-shafts with reference to the intergeared mechanism, to reverse the direction of operation of the engine and intergeared mechanism.

10. A valve-operating mechanism for the intake-valves and exhaust-valves of a multiple-cylinder internal-combustion engine including a main shaft common to all the cylinders, counter-shafts pertaining to each series of valves and geared to the main shaft, cams on the counter-shafts having similar faces on opposite ends adapted to actuate the valves to operate the engine in reverse directions, a pinion on the main shaft, intergeared wheels journaled on the counter-shafts, beveled gears secured on the counter-shafts, intermeshing beveled gears radially journaled in the wheels, and means for rotating the radially journaled gears, thereby to rotate the counter-shafts in opposite directions in the intergeared wheels.

11. A valve-operating mechanism for the intake-valves and exhaust-valves of a multiple-cylinder internal-combustion engine including a main shaft common to all the cylinders, counter-shafts pertaining to each series of valves and geared to the main shaft, cams on the counter-shafts having similar faces on opposite ends adapted to actuate the valves to operate the engine in reverse directions, a pinion on the main shaft, intergeared wheels journaled on the counter-shafts, beveled gears secured on the counter-shafts, intermeshing beveled gears radially journaled in the wheels, and means for rotating the radially journaled gears, thereby to rotate the counter-shafts in the intergeared wheels.

12. A valve-operating mechanism for the intake-valves and exhaust-valves of a multiple-cylinder internal-combustion engine including a main shaft common to all the cylinders, counter-shafts pertaining to each series of valves and geared to the main shaft, cams on the counter-shafts having similar faces on opposite ends adapted to actuate the valves to operate the engine in reverse directions and gearing connections between the main shaft and the counter-shafts whereby the counter-shafts may be rotated in opposite directions to change their position with relation to the main shaft.

13. A valve-operating mechanism for the intake-valves and exhaust-valves of a multiple-cylinder internal-combustion engine including a main shaft common to all the cylinders, counter-shafts pertaining to each series of valves and geared to the main shaft, cams on the counter-shafts having similar faces on opposite ends adapted to actuate the valves to operate the engine in reverse directions and gearing connections between the main shaft and the counter-shaft whereby the counter-shafts may be rotated to change their position with relation to the main shaft.

14. An engine including a vertically-movable valve lifter, a shaft below the lifter and having a cam thereon adapted to raise the lifter, a lever on a movable pivot adjacent to the shaft, and a normally inoperative yoke pivoted to one end of the lever and adapted to raise the lifter by an oscillation of the lever, the free end of the lever extending below the shaft and adapted to be moved by the lever pivot into the path of the cam to raise the lifter intervening the direct cam action.

15. An engine including a vertically-movable valve lifter, a shaft below the lifter and having a cam thereon adapted to raise the lifter, a lever adjacent to the shaft, and a normally inoperative yoke pivoted to one end of the lever and adapted to raise the lifter by an oscillation of the lever, the free end of the lever extending below the shaft and adapted to be moved into the path of the cam to raise the lifter intermediate the direct cam action.

16. An internal combustion engine including at least six cylinders, intake valves and exhaust valves for the several cylinders, a main shaft common to all the cylinders, non-shifting counter-shafts geared to the main shafts and having actuating cams thereon adapted to open the valves for a four-cylinder operation of the engine, means for supplying compressed air to at least three of the cylinders for a two-cycle operation thereof, means for rendering inoperative the intake-valve actuating-cams of the three cylinders, means for opening the exhaust valves of the three cylinders for the two-cycle operation, and means for rotating the counter-shafts with reference to the intergeared mechanism to reverse the direction of operation of the engine.

17. An internal combustion engine including at least three cylinders, intake valves and exhaust valves for the several cylinders, a main shaft common to all the cylinders, non-shifting counter-shafts geared to the main shaft and having actuating cams thereon adapted to open the valves for a four-cycle operation of the engine, means for supplying compressed air to at least three of the cylinders for a two-cycle operation thereof, means for rendering inoperative the intake-valve actuating cam of the three cylinders, means for opening the exhaust valves of the three cylinders for the two-cycle operation, and means for rotating the counter-shafts with reference to the intergeared mechanism to reverse the direction of operation of the engine.

18. An internal combustion engine including at least three cylinders, intake valves and exhaust valves for the several cylinders, a main shaft common to all the cylinders, non-shifting counter-shafts geared to the main shaft and having actuating cams thereon adapted to open the valves for a four-cycle operation, means for supplying compressed air to the cylinders for a two-cycle operation, means for rendering inoperative the intake-valve actuating-cams, means for opening the exhaust-valves of the cylinders for the two-cycle operation, and means for rotating the counter-shafts with reference to the intergeared mechanism to reverse the direction of operation of the engine.

19. An internal combustion engine including at least three cylinders, intake valves and exhaust valves for the several cylinders, a main shaft common to all the cylinders, non-shifting counter-shafts geared to the main shaft and having actuating cams thereon adapted to open the valves for a four-cycle operation, means for supplying compressed air to the cylinder for a two-cycle operation, means for rendering inoperative the intake-valve actuating cams, means for opening the exhaust valves of the cylinder for the two-cycle operation, and means for rotating the counter-shafts with reference to the intergeared mechanism to reverse the direction of rotation of the engine.

JAMES A. VIELE.

Witnesses:
 RUTH A. MILLER,
 J. H. BISHOP.